United States Patent [19]

Nilius

[11] Patent Number: 4,774,465
[45] Date of Patent: Sep. 27, 1988

[54] POSITION SENSOR FOR GENERATING A VOLTAGE CHANGING PROPORTIONALLY TO THE POSITION OF A MAGNET

[75] Inventor: Hans-Joachim Nilius, Seligenstadt, Fed. Rep. of Germany

[73] Assignee: Vacuumschmelze GmbH, Fed. Rep. of Germany

[21] Appl. No.: 11,925

[22] Filed: Feb. 6, 1987

[30] Foreign Application Priority Data

Mar. 27, 1986 [DE] Fed. Rep. of Germany ....... 3610479

[51] Int. Cl.[4] .................. G01B 7/14; H01F 21/00; G08C 19/06
[52] U.S. Cl. .................. 324/208; 336/110; 340/870.33
[58] Field of Search .............. 324/207, 208; 340/870.31, 870.33, 870.35, 870.36; 336/30, 45, 110, 133, 134, 135

[56] References Cited

U.S. PATENT DOCUMENTS 2,692,357 10/1954 Nilson ............... 340/870.35

FOREIGN PATENT DOCUMENTS 53-76056 7/1978 Japan ................... 324/208

OTHER PUBLICATIONS

"Rugged Heavy Duth Linear Displacement Transducer," Krause, Technisches Messen, vol. 50, No. 10, 1983, pp. 373–378.

Primary Examiner—Reinhard J. Eisenzopf
Assistant Examiner—Walter E. Snow

[57] ABSTRACT

A sensor for identifying the position of a test object has a strip-shaped core of low magnetic coercivity which is magnetized with opposite polarities by two excitation coils disposed at opposite ends of the core, and a secondary coil wrapped around the core between the two excitation coils. The test object generates a magnetic field which saturates the core at a location corresponding to the position of the test object between the two excitation coils, thereby simulating an air gap in the core at this location. The voltage across the terminals of the secondary coil changes in accordance with the position of the simulated air gap, thus providing a signal indicating the position of the test object.

12 Claims, 2 Drawing Sheets

POSITION SENSOR FOR GENERATING A VOLTAGE CHANGING PROPORTIONALLY TO THE POSITION OF A MAGNET

BACKGROUND OF THE INVENTION

1. Field of the Invention

The present invention relates to a magnetic position sensor, and in particular to a position sensor for generating a signal corresponding to the position of a magnetic test object moveable along and out of contact with a core of low magnetic retentivity between two excitation coils which magnetize the core.

2. Description of the Prior Art

A magnetic position sensor is described in the periodical Technisches Messen, Vol. 50, No. 10, 1973 at pages 373–378, which has an elongated rectangular magnetic core with a primary winding and a secondary winding respectively disposed at the opposite shorter sides of the rectangle. A test object whose position is to be identified by the position sensor is in the form of a short-circuit ring which surrounds one of the longer sides of the low-coercivity core. The short-cirucit ring generates a virtual air gap (i.e., simulates an air gap) in the low-coercivity core at a location corresponding to the position of the ring between the primary and secondary windings. An air gap is simulated because the short circuit currents induced in the core at the location of the test object substantially prevent the magnetic core from carrying a magnetic flux at that location.

If the test object (short-circuit ring) is situated in the middle of the elongated leg of the low-coercivity core, the two magnetic systems, respectively consisting of the primary and secondary coils, have the same stray field, so that the voltages generated in pick-up coils will be equal to each other and will cancel each other in a differentiating circuit.

When the test object is moved away from the middle position laterally along the longer side of the rectangle, the induced voltage in one of the pick-up windings is increased and the other is diminished. A voltage having a magnitude dependent upon the position of the test object is thus obtained, so that the path traversed by the test object can be identified.

SUMMARY OF THE INVENTION

It is an object of the present invention to provide a magnetic position sensor of simplified construction in comparison to known devices having at least the same precision as such known devices.

It is a further object of the present invention to provide such a magnetic position sensor which can be used in environments not suitable for conventional sensors.

The above objects are achieved in accordance with the principles of the present invention in a magnetic position sensor having a low-coercivity core in the form of an elongated strip. Two excitation coils are wound around the strip-shaped core at opposite ends thereof (or at least spaced from each other) and are connected to an alternating voltage source such that the excitation currents in the coils oppositely magnetize the low-coercivity core. A secondary winding is wound around the core between the excitation coils. The length of the secondary winding corresponds to the path along which a signal can be acquired corresponding to the position of a test object. A test object which generates a magnetic field, such as a permanent magnetic, is moved along the core in the region of the secondary coil. The presence of the test object simulates an air gap in the core at a location corresponding to the position of the test object.

DESCRIPTION OF THE PREFERRED EMBODIMENTS

Figure 1:
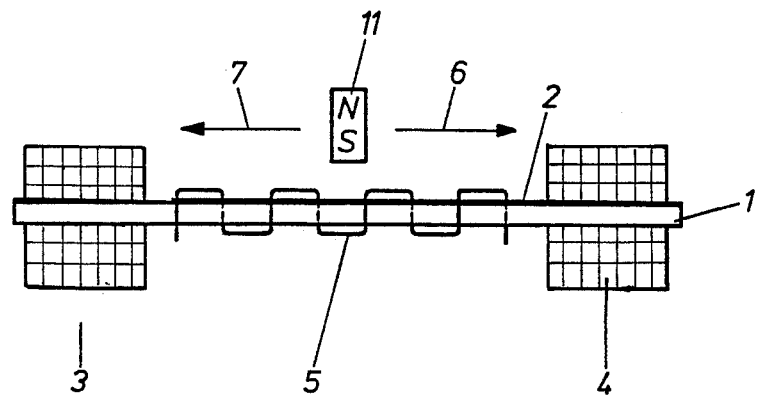
FIG. 1 is a schematic side view of a magnetic position sensor constructed in accordance with the principles of the present invention.

The basic structure of a magnetic position sensor constructed in accordance with the principles of the present invention is schematically shown in FIG. 1, i.e., without mounts, a housing, and the like. The sensor includes a carrier 1 which may, for example, be a plastic strip, and a strip 2 of magnetic material attached, such as by gluing, to the carrier 1. The strip 2 forms the low-coercivity core of the sensor.

Any low-coercivity material can be employed as the strip 2, however, a preferable material is amorphous metal because amorphous metal is insensitive to bending and exhibits high permeability. If an amorphous metal of a cobalt base alloy having a negligibly small magnetostriction is used, it is possible, depending upon the flexibility of the carrier 1, to obtain magnetic position sensors of many different contours, rather than a straight-line sensor.

The sendor further includes two excitation coiles 3 and 4 disposed at locations speced from each other along the carrier 1 and the core 2, such as at the ends of the carrier 1. A secondary coil is disposed between the excitation coils 3 and 4, such as by winding around the carrier 1 and the strip 2, and occupies the entire length between the excitation coils 3 and 4.

A test object 11 is mounted so as to be displaceable along the core 2 in the direction of arrows 6 and 7. The test object 11 generates a magnetic field and may, for example, be a permanent magnet. The distance of the test object 11 from the secondary coil 5 or from the core 2, is selected dependent upon the strength of the magnetic field generated by the test object 11 such that the core 2 is just barely saturated by the magnetic field of the test object 11. Due to the saturation of the core 2 by the test object 11, a simulated or virtual air gap will be present along the length of the core 2 at a location corresponding to the position of the test object 11.

As in conventional sensors, a short-circuit ring could alternatively be used as the test object 11. The use of such a short circuit ring as the test object 11 in the magnetic position sensor disclosed herein is even simplier than in the aforementioned known device, because such a ring could easily be slipped over the end of the core in the sensor disclosed herein, whereas such a ring must be wound around one of the longer legs of the closed rectangular core in the known sensor.

Preferably the windings of the secondary coil 5 have the same spacing from each other in order to obtain an output signal which is substantially linearly dependent upon the dislocation of the test object 11 from the center of the sensor. Spacing the windings in this manner avoids the necessity for any special circuitry for linearizing the analog output signal of the sensor.

Figure 2:
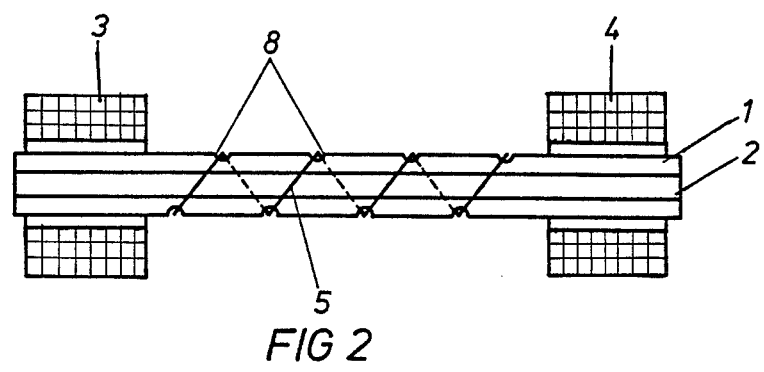
FIG. 2 is a side view of one embodiment of a magnetic position sensor constructed in accordance with the principles of the present invention.

An embodiment of the sensor shown in FIG. 2 achieves uniform spacing of the individual windings of the secondary coil 5 by the use of a carrier 1 which is slightly wider than the core 2, and which has a plurality of equidistantly spaced notches 8 at the edges thereof for receiving the wire forming the secondary coil 5.

Figure 3:
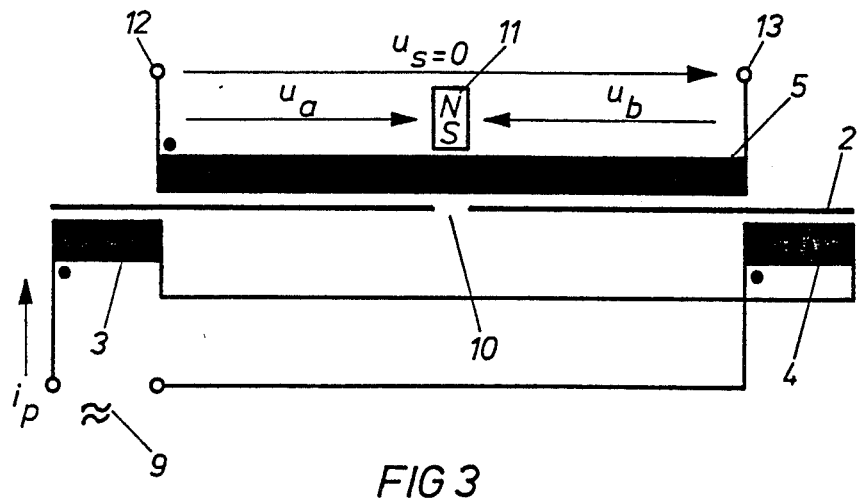
FIG. 3 is a circuit diagram of a magnetic position sensor constructed in accordance with the principles of the present invention with the test object disposed at a null point in the center of the sensor.

The operation of the magnetic position sensor disclosed herein will be explained with the circuit diagrams of FIGS. 3 and 4. As shown in FIG. 3, the excitation windings 3 and 4 are connected in series to an alternating voltage source 9 so that they attempt to oppositely magnetize the low-coercivity core 2. With the test object 11 in a middle or null position, a simulated air gap 10, schematically indicated by interruption of the core 2, is present in the middle between the excitation coils 3 and 4. Because the magnetic flux at this location is zero anyway, because of the opposite magnetization of the ends of the core 2, the presence of a simulated air gap at this location has no influence on the voltage generated at terminals 12 and 13 of the secondary coil 5. Voltages $u_a$ and $u_b$ having opposite polarity (phase-shifted by 180°) are shown in FIG. 3 respectively between the terminals 12 and 13 and the location of the test object 11. The sum voltage $u_s$ acros the terminal 12 and 13 of the secondary coil 5 is thus 0 with the test object 11 positioned as shown in FIG. 3.

Figure 4:
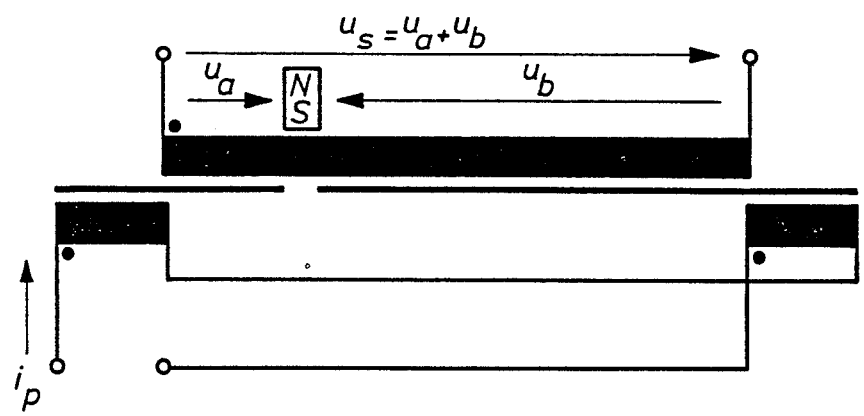
FIG. 4 is a cirucit diagram of a magnetic position sensor constructed in accordance with the principles of the present invention with the test object moved away from the null point.

When the test object 11 is moved, for example, to the left as shown in FIG. 4, the voltage $u_a$ will be diminished and the voltage $u_b$ will be increased, so that a value for the sum voltage $u_s$ dependent on the position of the test object 11 results. Due to the non-central position of the simulated air gap 10, the flux departing from the excitation coil 3 is attenuated in the center between the excitation coils 3 and 4, so that the magnetization influence of the excitation coil 4 predominates.

Figure 5:
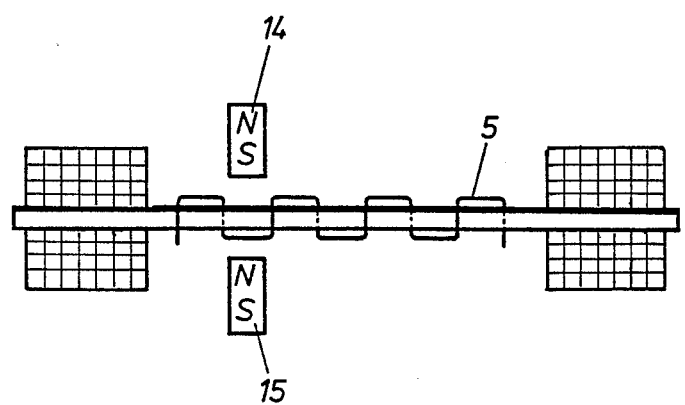
FIG. 5 is a schematic diagram of a magnetic position sensor constructued in accordance with the principles of the present invention with a test object consisting of two magnets.

Another embodiment of the sensor is shown in FIG. 5 which reduces errors in the sum voltage $u_s$ which may be caused by the influence of other constant magnetic fields on the position of the simulated air gap 10. Falsification of the measured sum voltage $u_s$ as a result of such extraneous fields can be significantly reduced by the use of a test object consisting of two permanent magnets 14 and 15 disposed on opposite sides of the coil 5 with opposite poles facing the coil 5. The permanent magnets 14 and 15 in this embodiment form the test object 11 in combination. The magnets 14 and 15 may be disposed at arbitrary locations in relationship to the core 2 with the only criterion being that the magnetic fields generated by the magnets 14 and 15 saturate the low-coercivity core 2, and are thus capable of generating the simulated air gap.

Although modifications and changes may be suggested by those skilled in the art it is the intention of the inventor to embody within the patent warranted hereon all changes and modifications as reasonably and properly come within the scope of his contribution to the art.

I claim as my invention:

1. A magnetic position sensor for generating a signal corresponding to the position of a moveable test object, said test object generating a magnetic field, said sensor being for use with an alternating voltage source and comprising in combination with said test object:
   a strip-shaped core consisting of material having low magnetic coercivity disposed out of contact with said test object but within the magnetic field of said test object so as to be saturated thereby at a location along said core corresponding to the position of said test object;
   two excitation coils spaced from each other with at least a portion of said core therebetween, said excitation coils respectively connectable to said alternating current source for oppositely magnetizing said core; and
   a secondary coil wound around said core between said excitation coils, said secondary coil having terminals across which a position signal is measured,
   whereby upon magnetization of said core by said excitation coils, a simulated air gap is generated at a location along said core by said test object, thereby changing the voltage across said terminals of said secondary coil corresponding to said position signal.

2. A magnetic position sensor as claimed in claim 1, wherein said test object is a single permanent magnet.

3. A magnetic position sensor as claimed in claim 1, wherein said test object comprises two permanent magnets disposed on opposite sides of said core with respectively opposite poles facing said core.

4. A magnetic position sensor as claimed in claim 1, wherein said core consists of a strip of amorphous metal.

5. A magnetic position sensor as claimed in claim 4, wherein said amorphous metal strip is flexible for permitting said core to be bent to a selected contour.

6. A magnetic position sensor as claimed in claim 1, further comprising:
   a carrier disposed between said excitation coils to which said strip-shaped core is attached.

7. A magnetic position sensor as claimed in claim 6, wherein said carrier and said core are both flexible for permitting said carrier and said core to be bent to selected contours.

8. A magnetic position sensor as claimed in claim 6, wherein said carrier is wider than said core, and wherein said carrier has a plurlaity of notches at the edges thereof for receiving and fixing the windings of said secondary coil.

9. A magnetic position sensor as claimed in claim 8, wherein said notches are equidistantly spaced along a distance measured between said excitation coils.

10. A magnetic position sensor as claimed in claim 1, wherein said core consists of a cobalt based amorphous metal alloy having low magnetostriction.

11. A magnetic position sensor as claimed in claim 10 further comprising:
   a carrier extending between said excitation coils to which said core is attached, said carrier and said core being flexible for permitting said carrier and said core to be bent to selected contours.

12. A magnetic position sensor for use with an alternating current source comprising:
   a strip-shaped core of low magnetic coercivity material;
   two excitation coils spaced from each other along said core, said coils connectable to said alternating current source for respectively generating oppositely directed magnetic flux in said core;
at least one permanent magnet disposed a distance from said core between said excitation coils and generating a magnetic field which saturates said core at a location corresponding to the position of said magnetic between said excitation coils; and
a secondary coil wound around said core between said excitation coils and having terminals across which a voltage is present when said excitation coils are connected to said alternating current source, said voltage varying in accordance with a change in the position of said magnet along said core between said excitation coils.

* * * * *